Aug. 26, 1941.　　　T. DE GRAVE　　　2,253,692
FILTER CONSTRUCTION
Filed Feb. 5, 1940　　　2 Sheets-Sheet 2
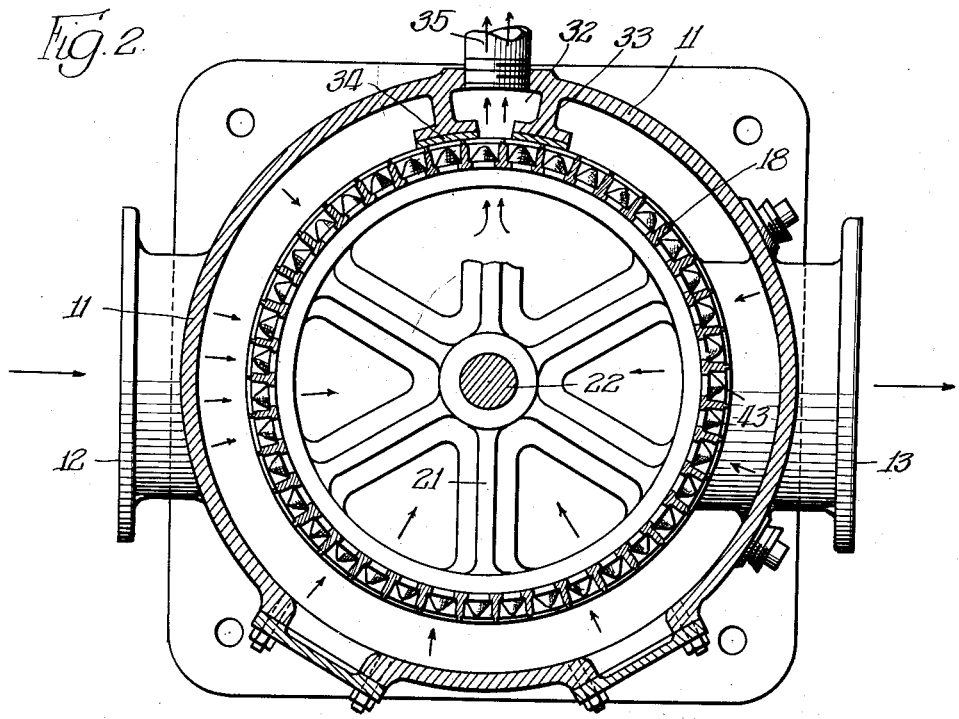
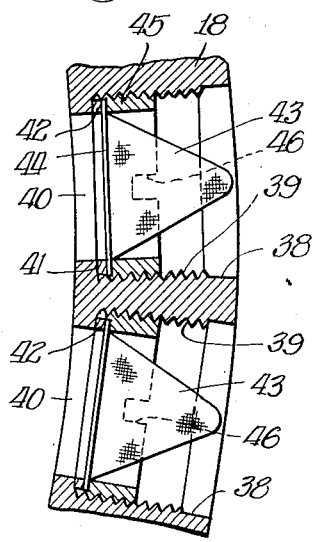
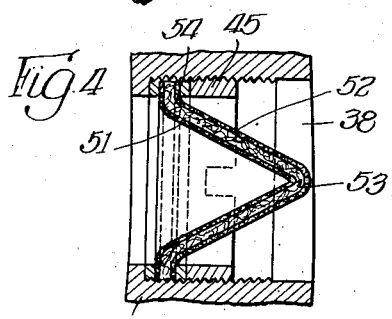
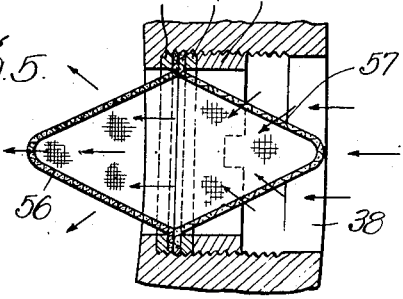
INVENTOR.
Thomas De Grave,
BY
ATTORNEYS.

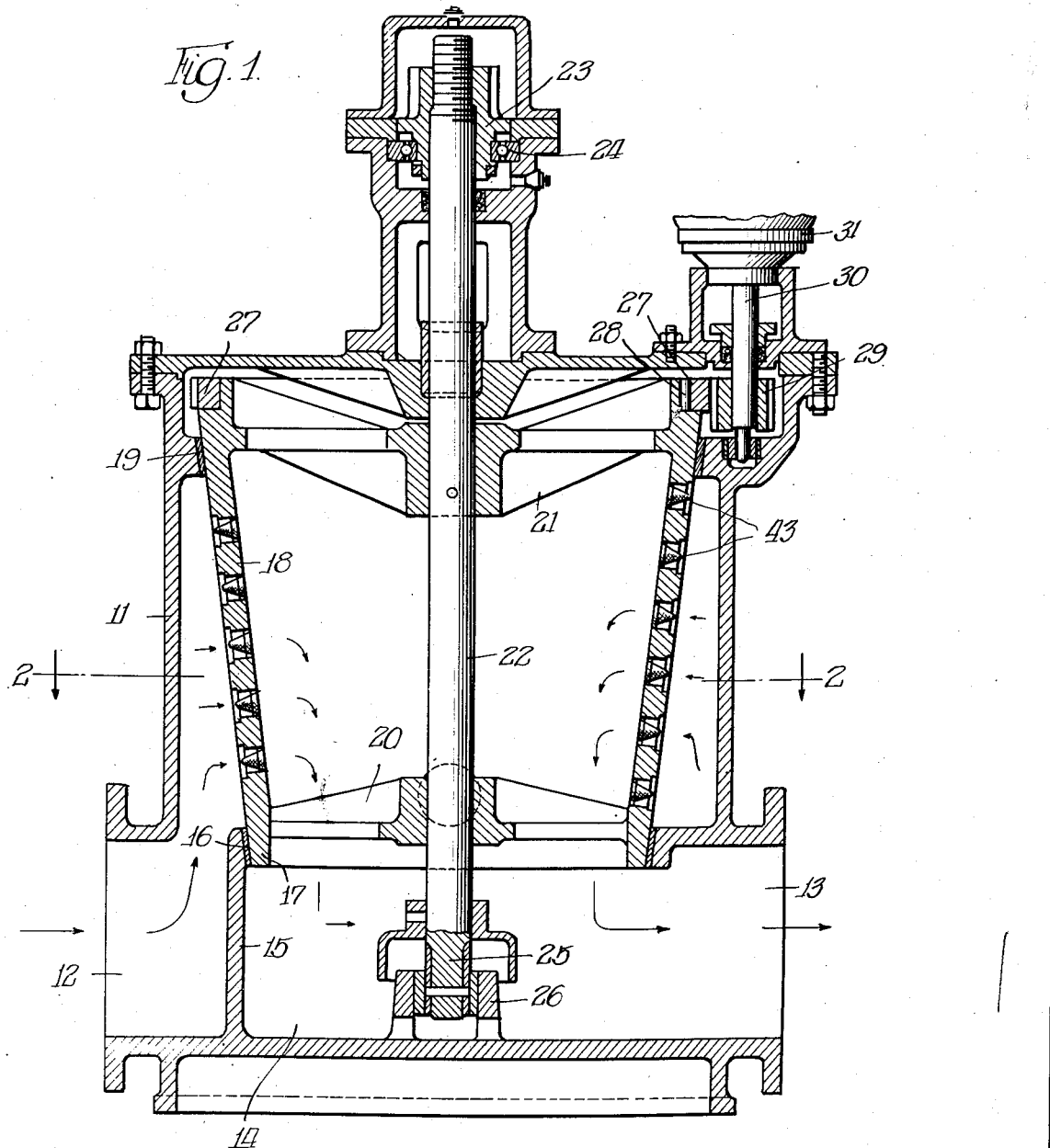

Patented Aug. 26, 1941

2,253,692

UNITED STATES PATENT OFFICE 2,253,692

FILTER CONSTRUCTION

Thomas De Grave, Chicago, Ill., assignor to H. A. Brassert & Company, Chicago, Ill., a corporation of Illinois Application February 5, 1940, Serial No. 317,303

3 Claims. (Cl. 210—152)

This invention relates to a new and improved construction of filtering media and more particularly to the shape of said media and the relationship of the face of the media to the flow of fluid to be filtered thereby.

While my improved filtering media are adapted for other uses, they are especially adapted for use in connection with filter of the backwashing type and are shown and described herein in connection with such a filter.

My improved filtering media are designed to increase the effective filtering area with a given size of filter apparatus and to present the faces of the media at an angle to the flow of the liquid to be filtered in such manner that they afford a combined filtering and separating action.

It has been established that suspended solids will travel in lines substantially parallel to the flow of the liquid in which they are suspended. Thus with straining or filtering media having openings extending parallel to the line of flow, plugging of the mesh openings will result. This is particularly true where the solids are irregular or elongated in form, such as slivered coal or coke particles, husk or fibres in spent grain slop, wood fibres such as found in white water in paper mills, and other hairs and fibres. With the media formed to present faces at considerable angles to the lines of flow and with the mesh or openings in the media also at a considerable angle to the line of flow, there is a strong tendency for irregular or fibrous particles to slide over the surface of the media and not be caught in the mesh or openings. The action is both a filtering and a separating action with the strained or filtered liquid passing through the openings and the solids sliding over the surface of the media. By this action the solids are collected around the lower portion of the angularly disposed filtering faces and are not packed into the openings in the media. They may therefore be readily swept away from the media by a reversed flow of fluid.

This method of placing the faces of the filtering media at an angle to the flow also substantially increases the effective filtering area where the filtering medium extends across a given flow area as a pipe or passage. Desirable results can be obtained by placing a substantially flat filtering medium across the flow area at an angle to the axis of flow, but the most efficient filtering and greatest increase in effective filtering area is provided by a conical filtering medium with the apex of the cone toward the incoming flow and with the apex approximately upon the axis of flow.

It is an object of the present invention to provide a new and improved filter media construction with increased effective flow area and decreased tendency to clog with solids.

It is a further object to provide a filter construction in which the flow openings in the filter medium are located at an angle to the flow of the fluid to be filtered.

It is an additional object to provide a construction of this character especially adapted for use in connection with filters of the backwashing type.

It is also an object to provide a construction for filtering media of such shape as to provide increased resistance to flow pressure whereby a light and thin screen structure may maintain its form under service conditions.

It is another object to provide a construction in which filtering media of low strength or rigidity may be effectively supported between light screens or the like.

It is a further object to provide a compact and simply supported multiple filtering unit to provide successive filtering treatments.

Other and further objects will appear as the description proceeds.

I have shown certain preferred embodiments of my invention in the accompanying drawings, in which—

Figure 1 is a vertical section through a backwashing type of filter utilizing the filter media of the present invention;

Figure 2 is a transverse section of the construction of Figure 1, with parts broken away to more clearly show the structure;

Figure 3 is a fragmentary section on an enlarged scale showing one type of filter medium;

Figure 4 is a view similar to Figure 3 but showing a modified form of construction; and Figure 5 is a view similar to Figure 3 but showing a further modification.

In the drawings, referring first to Figures 1 and 2, the filter housing 11 is provided with an intake opening 12 and with an outlet opening 13. The outlet chamber 14 is formed by walls 15 which support a conical bearing 16 into which fits the lower edge 17 of the rotatable filter drum 18. The housing 11 is provided with an upper conical bearing 19 into which the upper portion of the drum 18 fits. The drum 18 is supported by spiders 20 and 21 from the shaft 22, which serves as an axis for rotation. This shaft 22 is supported at its upper end from the adjustment nut 23 which engages the roller bearing 24. The lower portion 25 of shaft 22 fits in the lower guide bearing 26. The upper portion of the drum 18 has a gear ring 27 keyed thereto by pins 28. The drive gear 29 meshes with gear 27 and is secured to shaft 30 driven by motor 31.

As shown in Figure 2, the housing 11 has formed therein the backwash receiving chamber 32, the inner faces 33 and 34 of the lateral walls of the chamber closely engaging the outer face of the drum 18. A pipe 35 is provided to withdraw the backwash fluid containing the solids. The details of construction of the rotary strainer or filter form no part of the present invention and need not be further described.

Referring next to Figure 3, the drum 18 is provided with a plurality of circular openings 38 which have threaded portions 39. The inner portions 40 of the openings 38 are reduced in size to provide shoulders 41 upon which are fitted packing washers 42. The conical filtering media 43 are shown as formed of wire mesh, and have flat base flanges 44 resting upon the packing washer 42. The clamping sleeve 45 is screwed into the threaded portion 39 of the opening, being provided with opposed notches 46 to be engaged by a suitable wrench.

The form of construction shown in Figure 4 differs from that of Figure 3 in that there are a plurality of mesh cones 51 and 52 fitted into the opening 38, and an additional filtering medium 53 is held between the cones. An additional packing ring 54 is shown upon the outer face of the outturned flange of the cone 52, this ring being held in place by the clamping ring 45.

In the form of construction shown in Figure 5 there are provided two oppositely pointed cone members 56 and 57 clamped between the washers 42 and 54 by the ring 45. The direction of flow is indicated by the arrows in Figure 5, and it will be noted that the cone 57 directed toward the flow is formed with larger mesh than the second cone 56.

The filtering material held between the two cones 51 and 52 of Figure 4 may consist of any type of material suitable for the particular filtering problem involved. It may comprise cloth formed of various materials such as glass, linen or cotton or filter paper or other fine wire meshes which have inadequate strength in themselves. It may comprise diatomaceous earth or other filter aids held between fine mesh or between layers of fabric or paper held in place by suitable wire mesh.

The operation of the filter construction shown and the function of the conical filtering media will be apparent from the drawings. As clearly shown in Figures 1 and 2, the fluid bearing the solids to be removed enters through passage 12 and flows upwardly and around all sides of the drum 18 with the exception of the narrow area covered by the backwashing chamber 32. The flow through the filtering media is at an angle to the faces of the media and the separated solids tend to collect around the base of the cones. As each cone passes by the backwashing chamber 32 the reverse flow of cleaned fluid from the interior of the drum 18 passes through the cone and carries with it the solids from around the cone, carrying them out through the offtake 35. Due to the rotary filter construction and continuous backwashing, even with large quantities of solids in the fluid to be filtered these solids do not collect in sufficient quantities in the openings to cover or clog substantial portions of the filter cones and do not pack down in place. They are, therefore, readily removed by the backwashing flow.

In the form of construction shown in Figure 5, the first cone 57 takes an initial cut of the entrained solids, removing all of the large solids in the same manner as the single cone described above. The second cone 56 removes additional finer solids during the filtering portion of the cycle, and during the backwash portion of the cycle these finer solids held up by cone 56 are washed back out through the wider mesh of cone 57.

The type and character of filtering material may be varied to suit the particular problem or the particular character of solids to be removed. Different types and sizes of wire mesh or other material may be used as filter media inserted in the openings. A wire mesh of suitable size may be sprayed with a coating of glass, porcelain or other suitable material in order to present a smooth, non-adhering surface to the viscous or sticky fluids containing suspended solids. The cones may be formed of other material than wire mesh, such as die-cast or stamped metal with suitable openings or of porcelain or other solid materials, such as synthetic resins, all of which may be formed with openings suitable in size and shape for the particular filtering problem.

It will be understood that while the filtering media have been shown in use in a rotary type of backwashing filter, they may be used in other types of filters which may or may not be provided with similar periodic cleaning. The filtering cones may be inserted in ordinary tubes or passages where the nature of the flow and of the solid material removed is not such as to require repeated and continuous cleaning of the filter unit.

While I have shown certain preferred types of structure for carrying out my invention, the structure is capable of change and variation to meet differing conditions and requirements and I contemplate such modifications as come within the spirit and scope of the appended claims.

What is claimed is:

1. In a filter of the backwashing type, a filter drum of substantial thickness having filter openings therein, and conical filtering means fitted within said openings and within the contour of the drum, means for supplying fluid to be filtered to one face of the drum, means for withdrawing filtered fluid from the other face of the drum, and a backwash receiving port located adjacent the first mentioned face of the drum, the apices of the cones being directed toward the flow with the filtering flow against the outer face of the cone and the backwashing flow against the interior of the cone.

2. In a filter of the rotary, backwashing type, a rotary filter drum of substantial thickness having filter openings therein, filtering media fitted in said openings, said media comprising hollow conical members placed base to base with the bases secured in the drum openings adjacent the inner face of the drum, each outwardly pointing cone being of such depth as to be within the opening in the drum, means for supplying fluid to be filtered to the outer face of the drum, means for withdrawing filtered fluid from the interior of the drum, and a backwash receiving port located adjacent the outer face of the drum.

3. In a filter of the rotary, backwashing type, a rotary filter drum of substantial thickness having filter openings therein, filtering media fitted in said openings, said media comprising hollow conical members placed base to base with the bases secured in the drum openings adjacent the inner face of the drum, each outwardly pointing cone being of such depth as to be within the opening in the drum, the cones being formed of wire mesh with the outwardly pointing cone having larger mesh openings than the other cone, means for supplying fluid to be filtered to the outer face of the drum, means for withdrawing filtered fluid from the interior of the drum, and a backwash receiving port located adjacent the outer face of the drum.

THOMAS DE GRAVE.